July 21, 1931. J. B. VICTOR 1,815,601
GASKET
Filed July 24, 1926
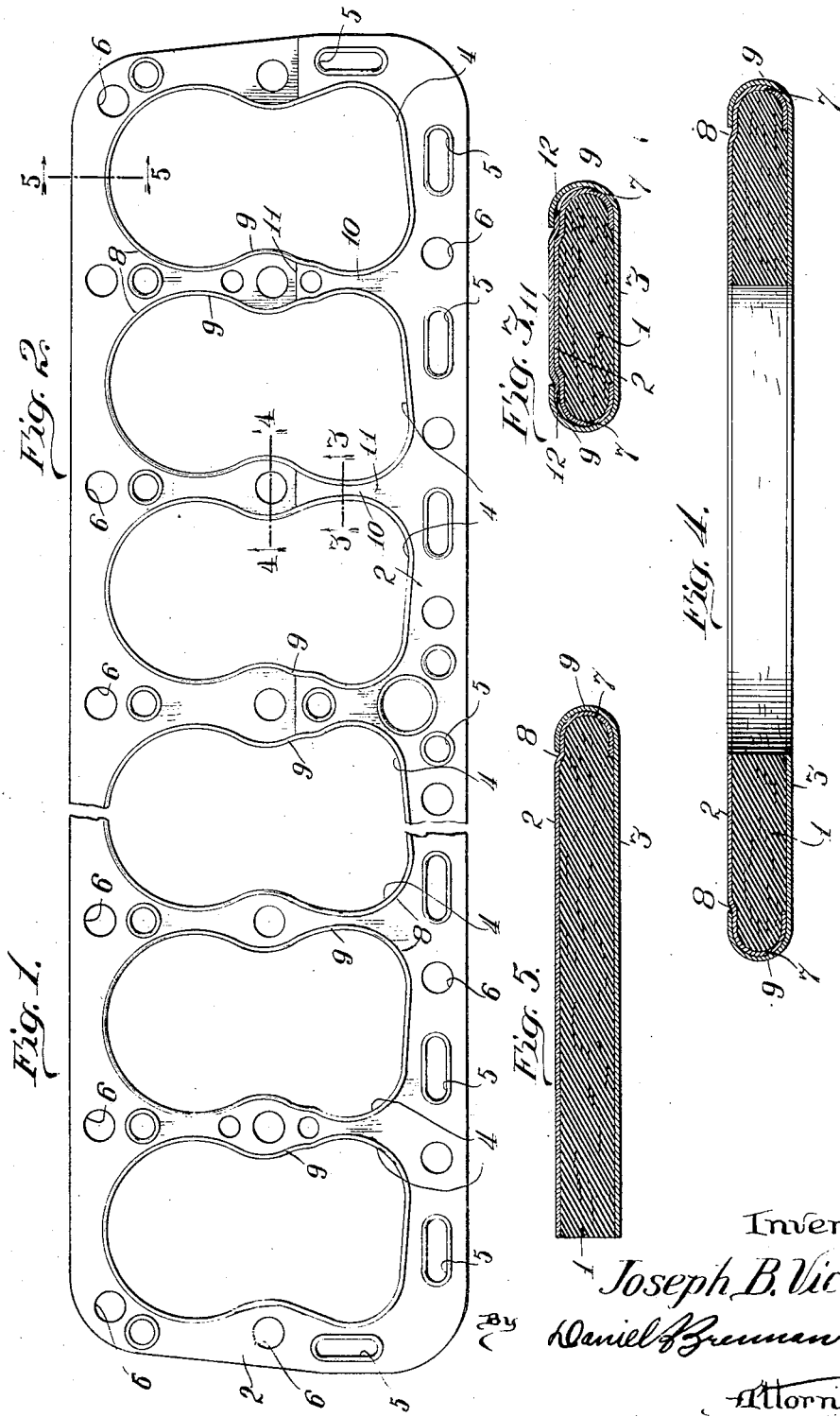
Inventor
Joseph B. Victor
By Daniel F. Brennan
Attorney Patented July 21, 1931

1,815,601

UNITED STATES PATENT OFFICE

JOSEPH B. VICTOR, OF CHICAGO, ILLINOIS, ASSIGNOR TO VICTOR MANUFACTURING & GASKET CO., A CORPORATION OF ILLINOIS

GASKET

Application filed July 24, 1926. Serial No. 124,656.

This invention relates to improvements in gaskets and particularly to gaskets adapted for insertion between the cylinder blocks and heads of internal combustion engines.

It is an object of the invention to provide a gasket comprising a more or less flexible refractory material interposed between metallic elements and to secure the various parts of the structure immovably in their proper relative positions.

Another object of the invention is to reinforce the edges of openings in the gaskets by interlocking joints through which the metallic layers of the gasket are united with each other.

Another object of the invention is to provide a gasket of this type with reinforcements at those parts which are particularly liable to be destroyed or injured by the heat of the gases, and to combine the reinforcing element for these weaker parts of the gasket with interlocking elements whereby portions of the inner and outer metal layers of the gasket are held in assembled relation.

With these and numerous other objects in view, an embodiment of the invention is illustrated in the accompanying drawings, wherein:

Figure 1 is a fragmental top plan view of a preferred embodiment of the invention.

Figure 2 is a view similar to Figure 1 showing a modified form of the invention.

Figures 3, 4 and 5 are sectional views on enlarged scales on lines 3—3, 4—4, and 5—5 respectively, of Figure 2.

As in other gaskets of this type the structure of the present invention comprises a more or less flexible core 1 of heat-proof material, such as for instance a sheet of asbestos, and metallic layers 2 and 3 formed of thin sheets of copper or copper bronze placed on opposite surfaces of the core 1 and firmly united with the same to form a self-contained structure which can easily be attached to or detached from the cylinders.

As shown in Figures 1 and 2, gaskets of this type are frequently made to be interposed between the block casting of a plurality of cylinders and the top or head of said casting. The gasket, therefore, is provided with openings 4 adapted to surround the bore of the cylinder, not shown, and the opening of the valve casing, not shown, and in addition to these openings 4 the gasket has a plurality of other openings 5, thru which for instance, the passages for the cooling medium in the jacket of the block casting may communicate with the passages in the top of the casting, while other openings, as indicated at 6, serve for receiving the bolts through which the top of the casting is secured to the body proper thereof.

It is to be understood, however, that the embodiment illustrated in the attached drawing and described in these specifications is selected by way of example only and that the invention is not to be limited to this particular form in which it has been shown and described.

Owing to the passage of the hot gases from the interior of the cylinder to the top thereof and owing to the flow of other media, it is those particular edges of the openings 4 and 5 which are directed towards said passages that are attacked and are burned out, thereby making a frequent change of gaskets necessary. In order to combine the layers 2 and 3 with each other in overlapping relation and firmly secure the same to the core 1 of the gasket and in order to strengthen those marginal portions of the gasket which are directed towards these openings, the layers 2 and 3 are provided with interlocking joints along the margins confining these openings. As will be seen from Figures 3, 4, and 5, the upper layer 2 is provided with a downward and inward directed flange 7 embracing the edge portion of the core, and compressing the same to a slightly smaller thickness than the body portion proper. For this purpose the upper layer 2 is provided with a slanting shoulder 8 from which the downward bent and curved flange 7 extends about the edge of the core 1. The reduction in thickness of the core at this point is just enough to permit a marginal portion 9 of the lower metallic layer 3 to be forced about the curved marginal part 7 of the upper layer and to project approximately towards the shoulder, whereby the combined thickness of the entire structure in its central part as well as in its marginal part is uniform and corresponds to the thickness of the core 1 increased by the thickness of the two layers 2 and 3 of sheet metal between which the core is placed. After these interlocking marginal portions have been forced into mutual engagement with each other by suitable presses, dies or machines, the two layers will be firmly united and interlocked with each other and the particular edges exposed to attack will be reinforced by the double metallic layer.

Owing to this firm engagement of the marginal flange portions of these layers 2 and 3 with each other and the compression exerted by the interlocking joint margin upon the core 1 of the gasket, it is not necessary to apply a similar interlocking joint at the free or outer edge of the gasket although it is obvious that similar means for combining the upper and lower layer of metal with each other may be provided at the free edge thereof.

This double layer of marginal portions at those edges of the core openings which are exposed to the heat of the gases stiffens the entire gasket considerably, whereby the handling and attachment of the same to the engine is facilitated. The interlocking joint comprises elements which are integral with the upper and lower layers of the gasket and it is, therefore, preferable over those types of gasket in which separate marginal reinforcements in the form of separate rings are used to secure them together at the margins of the openings. These special reinforcements are often forced off by the pressure of the engine parts upon each other and even where the gasket is subjected to too frequent handling before it is put in position on the engine, as well as while putting in place on the engine.

In many gaskets of this type the strip of the structure remaining between adjacent openings frequently is very narrow at certain points only, as for instance the parts indicated at 10, and it is at these points particularly that owing to the high degree of heat and composition of the combustion gases that the metal parts are damaged after a relatively short time, therefore, necessitating frequent renewal of the gaskets. In order to safeguard against this condition and to reinforce these attenuated portions 10 of the structure, there is placed in association with one of the metal layers of the gasket at these portions a reinforcing strip 11 of a shape corresponding to the area of the part which is particularly in danger of being burned out. The contour of the strip 11 obviously must coincide substantially with the contour of those portions of the layer which it is to cover. Marginal portions 12 of this strip 11 are held in position between the flanged parts 7 and 9 of the metallic layers which form the main portions of the gasket, thereby eliminating the necessity of applying additional attachment means for this reinforcing surface element. As will be seen from Figure 3 the reinforcing surface element 11 has slightly offset flange parts which are shaped in accordance with the narrow bridge 10 and other parts to which this reinforcing element is to be applied, the marginal portions 12 being deflected from the plane of the reinforcing element 11 into a lower plane along the shoulder with which the associate sheet metal layer 2 is provided. The opposite layer 3 of sheet metal is here also equipped with marginal portions 9 which are curved in the opposite directions and embrace with their free margins the deflected portions 12 of the reinforcing element 11 whereby these curved marginal portions 9 not only serve for interlocking the sheet metal parts 2 and 3 but also serve for holding the reinforcing element 11 in position.

This addition of the reinforcing element 11 to the weaker part of the gasket has a tendency to stiffen the same and at the same time it will effectively protect this part which is most exposed to injury by the hot gases, thereby materially increasing the life of the gasket. It will also be seen that this reinforcing element is secured in position without necessitating the attachment of additional fastening means and that the locking elements 8, 9 of the sheet metal layers 2, 3 serve for holding each other in position, for retaining the core of asbestos or the like in proper position, and also for retaining the reinforcing strip 11 securely in that position which it is to occupy.

I claim:

1. A gasket having an opening and comprising upper and lower metal layers spaced apart and a compressible core interposed between said layers, the marginal portions of the layers about said opening being oppositely curved and interlockingly engaged and forming a curved double-layer wall at the opening, the marginal edge of each layer extending away from said opening in contact with the other layer and forming a double-layer wall at the top and at the bottom of the gasket adjacent the curved wall and the compressible core extending between said double-layer walls and to said curved wall.

2. A gasket having an opening and comprising upper and lower metal layers spaced apart and a compressible core interposed between said layers, the marginal portions of the layers about said opening being oppositely curved and interlockingly engaged and forming a curved double-layer wall at the opening, the marginal edge of each layer extending away from said opening in contact with the other layer and forming a double-layer wall at the top and at the bottom of the gasket adjacent the curved wall, the compressible core extending between said double-layer walls and to said curved wall, the marginal portion of the layer forming the inner curved wall being deflected to receive the marginal edge of the layer forming the outer curved wall.

3. A gasket comprising a compressible core, upper and lower metal layers spaced apart, a flange on one of said layers enveloping an edge of the core and the portions of both surfaces of the core adjacent said edge, and a flange on the other of said layers overlapping the first mentioned flange and forming a double wall across said edge, the core filling the curved flanges whereby the general configuration of the edge is maintained under pressure.

4. A gasket having, in combination, a core, upper and lower protecting layers, a flange on the upper layer directed downwardly and inwardly and embracing an edge portion of the core and compressing the same, the core being reduced in thickness and a flange on the lower layer directed upwardly and inwardly, said flanges being interlockingly overlapped about said edge and uniting the layers on the core.

5. In a gasket, the combination of a core, upper and lower layers, a reinforcing element on one of said layers, the upper and lower layers being provided with interlocking marginal portions and the reinforcing element having a margin inserted between the interlocking marginal portions of the upper and lower layers.

6. In a gasket, the combination of a core, upper and lower layers, a reinforcing element, one of the layers having a deflected marginal portion and the reinforcing element also having a deflected marginal portion, the last named marginal portion being inserted between the marginal interlocking portions of the upper and lower layers, whereby the thickness of the entire structure is uniform over the entire area of the same.

7. A gasket to be clamped between the cylinder block and head of an internal combustion engine, said gasket having an opening to fit about the bore of a cylinder in the block, said gasket comprising a body portion made up of outer layers of relatively thin ductile sheet metal substantially uniform in thickness throughout and an interposed layer of asbestos or like material with registering openings in said layers to form the opening in the gasket for the bore, and metallic means carried by the gasket body about the opening in the gasket and in direct contact with the outer metal layers of the gasket, said metallic means having sufficient metal to carry off the extreme heat to which the gasket is subjected at the opening by the explosions in the cylinder, so as to prevent burning of the metal of the gasket at the opening without increasing the thickness of the metal layers.

8. A cylinder head gasket for internal combustion engines, said gasket having a body composed of outer layers of relatively thin ductile sheet metal substantially uniform in thickness throughout and an interposed layer of asbestos or similar material, said layers being coextensive and having a plurality of registering openings therein disposed and shaped to fit about the cylinder bores of the engine, said outer metal layers each having their marginal portions at the openings extending through the openings of substantially the same thickness as the body portions of the layers and in overlapping relation from one metal layer to the other to provide sufficient of the thin metal at and about the edges of the openings to carry away the extreme heat to which the gasket is subjected at its openings by the explosions in the cylinders so as to prevent burning of the thin metal of the gasket at the openings without any increase of the thickness of said outer metal layers.

9. A gasket for internal combustion engines or the like including a sheet of packing material having a cylinder opening within its limits, a plate of pliable metal on each face of the packing material and covering the same, one of said plates being folded through the cylinder opening and back on to the other face of the sheet of packing to an extent to produce a flat horizontal portion overlying said packing, and the other metallic plate being folded through the cylinder opening and back on the face of the first metal plate to substantially the same extent and producing a flat horizontal portion overlying said first metallic plate, said plates throughout the remaining portion of the gasket being so disposed as to give said gasket its greatest thickness in the region adjacent the edge of the cylinder opening in the gasket.

10. A gasket having an opening and comprising upper and lower metal layers spaced apart and a compressible refractory core interposed between said layers, the marginal portions of the layers about said opening being oppositely curved and interlockingly engaged and forming a curved double-layer wall at the opening, the marginal edge of each layer extending away from said opening in contact with the other layer and forming a double-layer wall at the top and bottom of the gasket adjacent the curved wall, and the refractory core extending between said double-layer walls and to said curved wall.

11. A gasket having an opening and comprising upper and lower metal layers spaced apart and a compressible refractory core interposed between said layers, the marginal portions of the layers about said opening being oppositely curved and interlockingly engaged and forming a curved double-layer wall at the opening, the marginal edge of each layer extending away from said opening in contact with the other layer and forming a double-layer wall at the top and bottom of the gasket adjacent the curved wall, the refractory core extending between said double-layer walls and to said curved wall, the marginal portion of the layer forming the inner curved wall being deflected to receive the marginal edge of the layer forming the outer curved wall.

12. A gasket comprising a compressible core, upper and lower metal layers spaced apart, a curved flange on one of said layers enveloping an edge of the core and the portions of both surfaces of the core adjacent said edge, and a curved flange on the other of said layers overlapping the first mentioned flange and forming a double wall across said edge, the core filling the curved flanges whereby the general configuration of the edge is maintained under pressure.

13. A gasket for internal combustion engines and the like including a sheet of packing material having an opening within its limits, a sheet metal plate on each face of the packing material and covering the same, one of said plates being folded through the opening in the packing material and back on the other face of the same and the other metal plate being folded through the opening and back on the face of the first metal plate, said folded metal portions being in overlapped relation with each other and the packing at and adjacent the opening.

In testimony whereof I affix my signature at 10 South La Salle Street, Chicago, Illinois.

JOSEPH B. VICTOR.